US009776285B2

(12) United States Patent
Li

(10) Patent No.: US 9,776,285 B2
(45) Date of Patent: Oct. 3, 2017

(54) DOUBLE-DIRECTIONAL MACHINING LASER MACHINE TOOL

(71) Applicant: Chun-Hao Li, Taipei (TW)

(72) Inventor: Chun-Hao Li, Taipei (TW)

( * ) Notice: Subject to any disclaimer, the term of this patent is extended or adjusted under 35 U.S.C. 154(b) by 0 days.

(21) Appl. No.: 15/232,264

(22) Filed: Aug. 9, 2016

(65) Prior Publication Data

US 2017/0057018 A1  Mar. 2, 2017

(30) Foreign Application Priority Data

Aug. 28, 2015 (CN) .................... 2015 2 0663067 U

(51) Int. Cl.

| | |
|---|---|
| *B23P 23/02* | (2006.01) |
| *B23K 26/384* | (2014.01) |
| *B23K 26/03* | (2006.01) |
| *B23K 26/042* | (2014.01) |
| *B23K 26/08* | (2014.01) |
| *B23K 26/00* | (2014.01) |
| *B23K 26/06* | (2014.01) |
| *B23K 26/04* | (2014.01) |

(52) U.S. Cl.
CPC ........ *B23K 26/384* (2015.10); *B23K 26/0093* (2013.01); *B23K 26/032* (2013.01); *B23K 26/048* (2013.01); *B23K 26/0619* (2015.10); *B23K 26/0823* (2013.01); *Y10T 29/5107* (2015.01)

(58) Field of Classification Search
CPC ............ B23K 26/0619; B23K 26/0823; B23K 26/38–26/389
USPC ............ 219/121.7, 121.71, 121.82; 29/26 R, 29/26 A
See application file for complete search history.

(56) References Cited

U.S. PATENT DOCUMENTS

| | | | | |
|---|---|---|---|---|
| 4,789,770 A | * | 12/1988 | Kasner .................. | B23K 26/03 219/121.7 |
| 5,149,937 A | * | 9/1992 | Babel ................. | B23K 26/0823 219/121.68 |
| 5,166,493 A | * | 11/1992 | Inagawa ............ | B23K 26/0604 219/121.69 |
| 5,339,103 A | * | 8/1994 | Schmidt ............. | B23K 26/0884 318/568.13 |

(Continued)

FOREIGN PATENT DOCUMENTS

| | | | |
|---|---|---|---|
| JP | 59-212185 A | * | 12/1984 |
| JP | 59-218293 A | * | 12/1984 |
| JP | 03-151182 A | * | 6/1991 |

*Primary Examiner* — Erica E Cadugan
(74) *Attorney, Agent, or Firm* — Rabin & Berdo, P.C.

(57) ABSTRACT

A double-directional machining laser machine tool includes a focused laser source, a lifting platform, a motion platform, a rotating platform, a height sensor, a vision module, and a control device. The control device drives, according to a distance detected by the height sensor, the lifting platform to lift the focused laser source up or down, and drives, according to an image, the motion platform to displace the bearing table, so as to enable a first laser beam outputted by the focused laser source forms a first recessed hole at a predetermined position on a first surface of a workpiece. The control device drives the rotating platform to rotate the workpiece, so as to enable the first laser beam forms a second recessed hole on a second surface of the workpiece, and the first recessed hole is in communication with the second recessed hole, so as to form a deep hole.

7 Claims, 4 Drawing Sheets

(56) References Cited

U.S. PATENT DOCUMENTS

| | | | | |
|---|---|---|---|---|
| 5,521,352 A * | 5/1996 | Lawson | ............... | B23K 26/067 |
| | | | | 219/121.67 |
| 5,525,776 A * | 6/1996 | Okamoto | ........... | B23K 26/0093 |
| | | | | 219/121.68 |
| 6,130,405 A * | 10/2000 | Loringer | .............. | B23K 26/046 |
| | | | | 219/121.71 |
| 6,393,687 B1 * | 5/2002 | Friedrich | ........... | B23K 26/0093 |
| | | | | 219/121.67 |
| 6,864,459 B2 * | 3/2005 | Chang | ............... | B23K 26/0075 |
| | | | | 219/121.71 |
| 7,603,930 B2 * | 10/2009 | Kato | .................... | B23Q 1/5437 |
| | | | | 269/58 |
| 8,338,745 B2 * | 12/2012 | Liu | ...................... | B23K 26/082 |
| | | | | 219/121.7 |
| 8,362,392 B2 * | 1/2013 | Elfizy | .................... | B25J 9/1664 |
| | | | | 219/121.67 |
| 2004/0164060 A1 * | 8/2004 | Maeda | ................. | H05K 3/0026 |
| | | | | 219/121.71 |

* cited by examiner

DOUBLE-DIRECTIONAL MACHINING LASER MACHINE TOOL

CROSS-REFERENCES TO RELATED APPLICATIONS

This non-provisional application claims priority under 35 U.S.C. §119(a) on Patent Application No. 201520663067.3 filed in China, P.R.C. on Aug. 28, 2015, the entire contents of which are hereby incorporated by reference.

BACKGROUND

Technical Field

The instant disclosure relates to a laser machine, and in particular, to a double-directional machining laser machine tool.

Related Art

Due to an inherent limitation of machining, generally, a limit of a diameter of a hole drilled by a conventional drill is 100 µm (micrometer). In addition, a drill with a smaller diameter is more likely to be damaged during processing. Therefore, in order to make a hole with a smaller diameter, the hole is made by laser processing. However, during the laser processing, laser beams are usually used as Gaussian waves directly or flat-headed waves obtained by applying beam modulation to the Gaussian waves. Therefore, a processed hole is wider in the top and narrower in the bottom, and it is difficult to control the flatness of the processed hole and to achieve a precision requirement.

SUMMARY

In view of this, the instant disclosure provides a double-directional machining laser machine tool, so as to form a relatively symmetrical deep hole by separately performing drilling on two surfaces of a workpiece.

An embodiment of the instant disclosure provides a double-directional machining laser machine tool, including: a focused laser source, a lifting platform, a motion platform, a rotating platform, a height sensor, a vision module, and a control device. The control device is electrically connected to the focused laser source, the lifting platform, the motion platform, the rotating platform, the height sensor, and the vision module. The focused laser source outputs a first laser beam. The lifting platform bears the focused laser source. The motion platform includes a biaxial slide and a bearing table on the biaxial slide. The rotating platform is connected to the bearing table, and the rotating platform is removably connected to a workpiece. The height sensor detects a distance between the height sensor and the workpiece. The vision module captures an image of the workpiece. The control device drives, according to the distance detected by the height sensor, the lifting platform to lift the focused laser source up or down, and drives, according to the image, the motion platform to displace the bearing table, so as to enable the first laser beam to form a first recessed hole at a predetermined position on a first surface of the workpiece. The control device drives the rotating platform to rotate the workpiece, so as to enable the first laser beam to form a second recessed hole, opposite to the first recessed hole, on a second surface opposite to the first surface of the workpiece, and the first recessed hole is in communication with the second recessed hole so as to form a deep hole.

In an embodiment, the double-directional machining laser machine tool may further include a modification laser source outputting a second laser beam, so as to trim an inner wall of the deep hole. A focus spot of the second laser beam is less than a focus spot of the first laser beam.

In another embodiment, the double-directional machining laser machine tool may further include a diamond milling cutter electrically connected to a control device so as to trim edges of openings at two ends of a deep hole.

In an embodiment, a bearing platform performs displacement on a motion plane along a biaxial slide, and a rotating shaft of a rotating platform is parallel to the motion plane.

In an embodiment, a diameter of a deep hole is less than 50 µm, and a depth of the deep hole is less than 500 µm.

With the foregoing double-directional machining laser machine tool, a rotating disc may be used to rotate a workpiece, and a focused laser source is used to separately perform drilling on two surfaces of the workpiece so as to form a relatively symmetrical deep hole. Moreover, an inner wall of the deep hole can be trimmed by using a modification laser source. On the other hand, a lifting platform may be provided with a focused laser source, a modification laser source, and a diamond drilling cutter so as to perform high-precision processing at the same environment.

BRIEF DESCRIPTION OF THE DRAWINGS

The instant disclosure will become more fully understood from the detailed description given herein below for illustration only, and thus are not limitative of the instant disclosure, and wherein.

DETAILED DESCRIPTION

Figure 1:
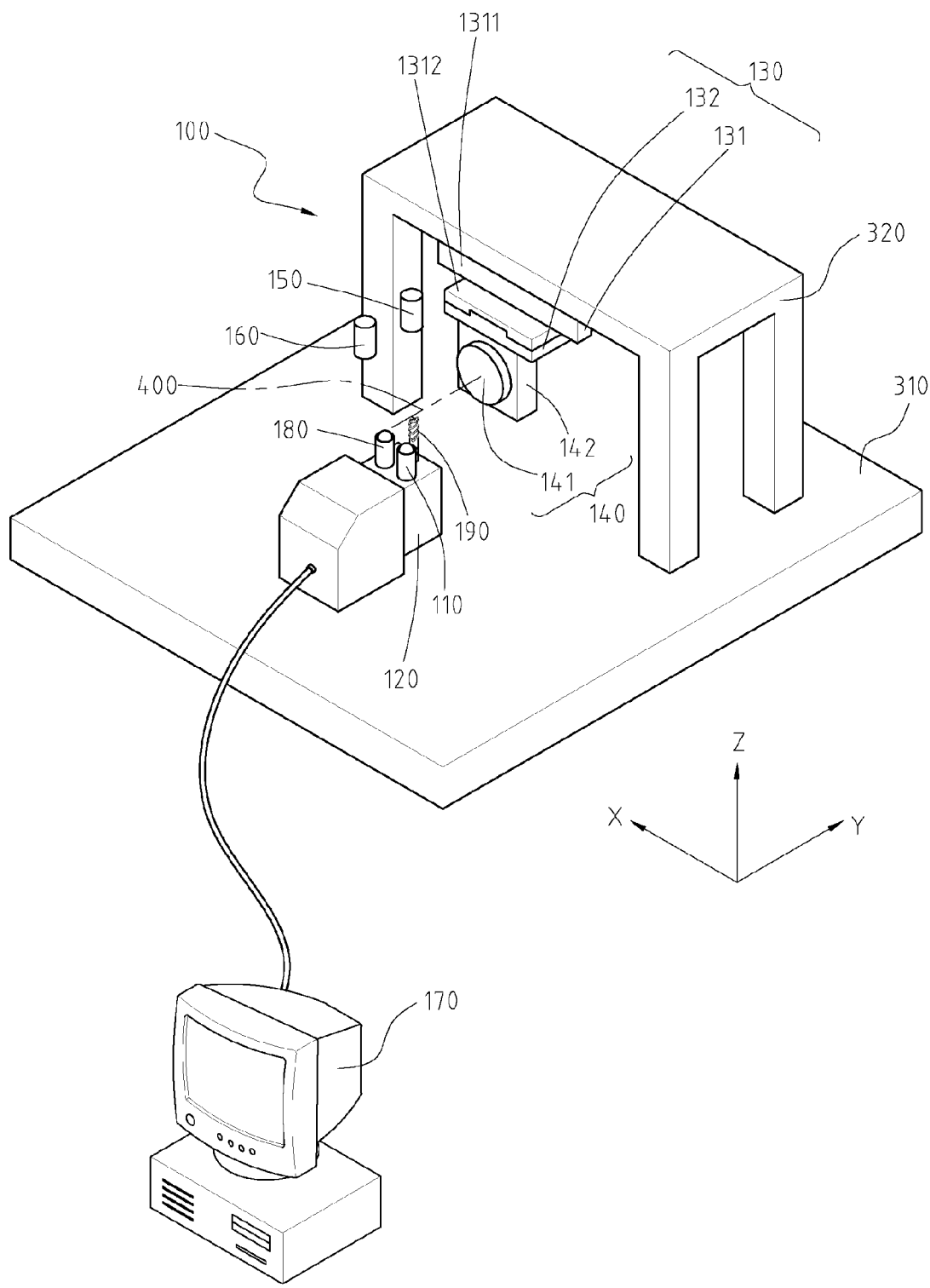
FIG. 1 is a perspective schematic view of a double-directional machining laser machine tool according to an embodiment of the instant disclosure.
Figure 2:
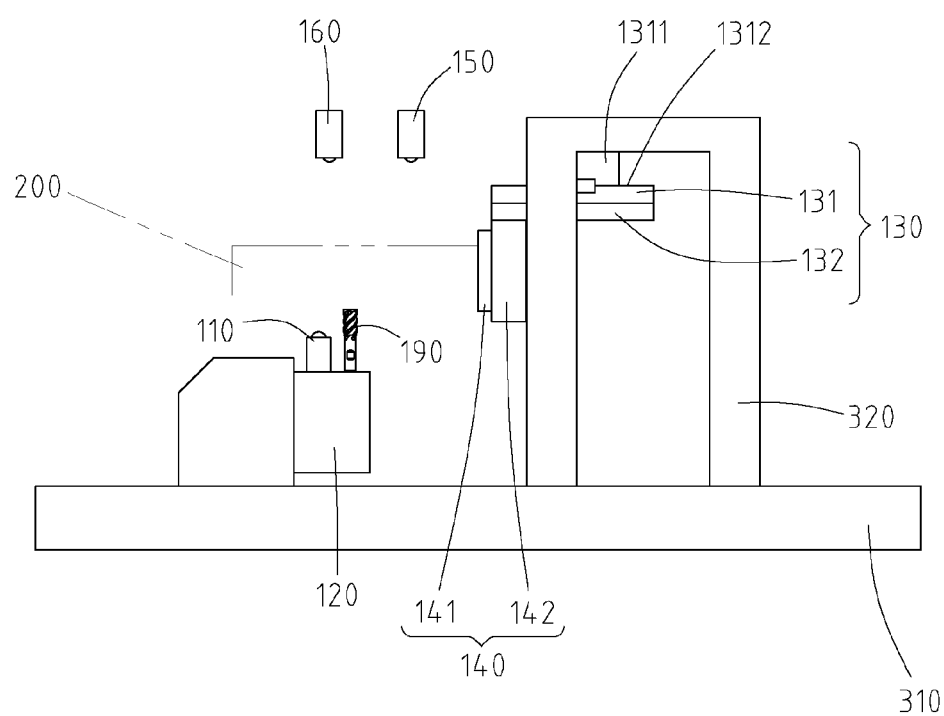
FIG. 2 is a schematic side view of the double-directional machining laser machine tool according to the embodiment of the instant disclosure.

Referring to FIG. 1 and FIG. 2 in combination, FIG. 1 and FIG. 2 are respectively a perspective schematic view and a schematic side view of a double-directional machining laser machine tool according to an embodiment of the instant disclosure. A double-directional machining laser machine tool 100 includes a base table 310, a frame body 320, a focused laser source 110, a lifting platform 120, a motion platform 130, a rotating platform 140, a height sensor 150, a vision module 160, and a control device 170. The base table 310 may be a granite platform and is configured to bear the frame body 320 and the lifting platform 120. The control device 170 is electrically connected to the focused laser source 110, the lifting platform 120, the motion platform 130, the rotating platform 140, the height sensor 150, and the vision module 160. The control device 170 may be a computer with computation and control capabilities such as a desktop computer, an industrial computer, an embedded controller, and the like, and the computer stores a control program and can execute the control program.

The lifting platform 120 bears the focused laser source 110. The focused laser source 110 outputs a first laser beam. The first laser beam is used to process a workpiece 200 to form a small hole with a high depth-to-width ratio, and the small hole cannot be formed by machining (e.g. drill). For example, a hole diameter is 50 µm, and a hole depth is 500 µm, and a depth-to-width ratio is 10. However, the high depth-to-width ratio of the embodiments of the instant disclosure is not limited thereto, for example, the depth to width ratio may be in a range of 5 to 20. A wavelength and energy of the first laser beam can be determined according to a material of a workpiece, and a width and a depth of a hole that is intended to form on the workpiece, which is not limited in the instant disclosure.

The motion platform 130 is hung on the frame body 320. The motion platform 130 includes a biaxial slide 131 and a bearing table 132 disposed on the biaxial slide 131. The biaxial slide 131 has an X-axis rail 1311 and a Y-axis rail 1312. The X-axis rail 1311 is parallel to an axial direction x, and the Y-axial rail 1312 is parallel to an axial direction y, so as to enable the bearing table 132 to perform displacement on a motion plane formed by the axial direction x and the axial direction y.

The rotating platform 140 is connected to the bearing table 132. Because the motion platform 130 is hung upside down on the frame body 320, the rotating platform 140 is located below the bearing table 132. The rotating platform 140 includes a base 141 and a rotating disc 142, and the rotating disc 142 can rotate relative to the base 141. The rotating platform 140 is removably connected (e.g. clamp or lock) to the workpiece 200, so that the workpiece 200 can rotate by at least 180° with a rotating shaft 400 (the axial direction y herein) of the rotating disc 142. Here, the rotating shaft 400 is one axial direction of the motion plane, and therefore is parallel to the motion plane. In other words, a disc surface of the rotating disc 142 is perpendicular to the motion plane.

The height sensor 150 is disposed at a side of the workpiece 200 opposite to a side of the workpiece 200 which is near to the focused laser source 110, so that the height sensor 150 can detect a distance between the height sensor 150 and the workpiece 200. Here, the height sensor 150 is located above the workpiece 200. The height sensor 150 can detect the distance between the height sensor 150 and the workpiece 200 along an axial direction z by using a position detection technology such as infrared, laser, and ultrasound technology. Therefore, the control device 170 can convert the distance detected by the height sensor 150 into a distance between the focused laser source 110 and the workpiece 200, and the control device 170 can drive, according to data obtained after the conversion, the lifting platform 120 to lift the focused laser source 110 up or down, so as to enable a focus spot of the first laser beam to accurately hit the workpiece 200. Here, the axial direction x, the axial direction y, and the axial direction z are perpendicular to each other.

The vision module 160 is disposed at a side of the workpiece 200 opposite to a side of the workpiece 200 which is near to the focused laser source 110. Here, the height sensor 150 is located above the workpiece 200, and the vision module 160 is next to the height sensor 150. The vision module 160 may be a camera, and therefore can capture an image of the workpiece 200. The control device 170 can analyze the image by using an image recognition technology, so as to determine a horizontal position of the workpiece 200 relative to the focused laser source 110. For example, a predetermined processing position on the workpiece 200 may be provided with a mark, and whether a position of the mark is in a focus position of the first laser beam is determined by using the image captured by the vision module 160.

Figure 3A:
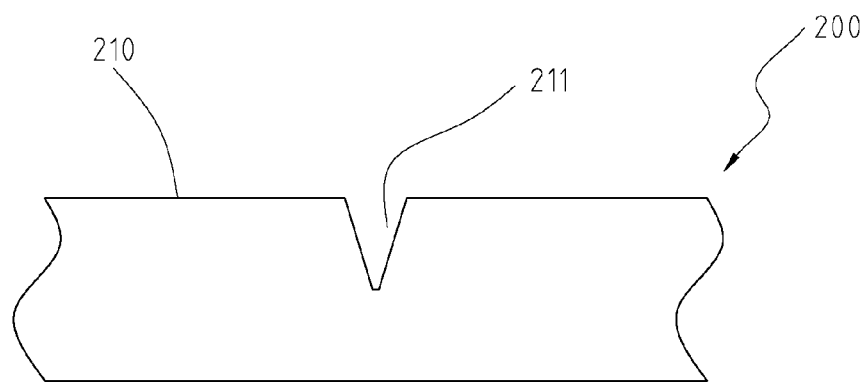
FIG. 3A is a schematic view (I) of deep hole processing according to an embodiment of the instant disclosure.
Figure 3B:
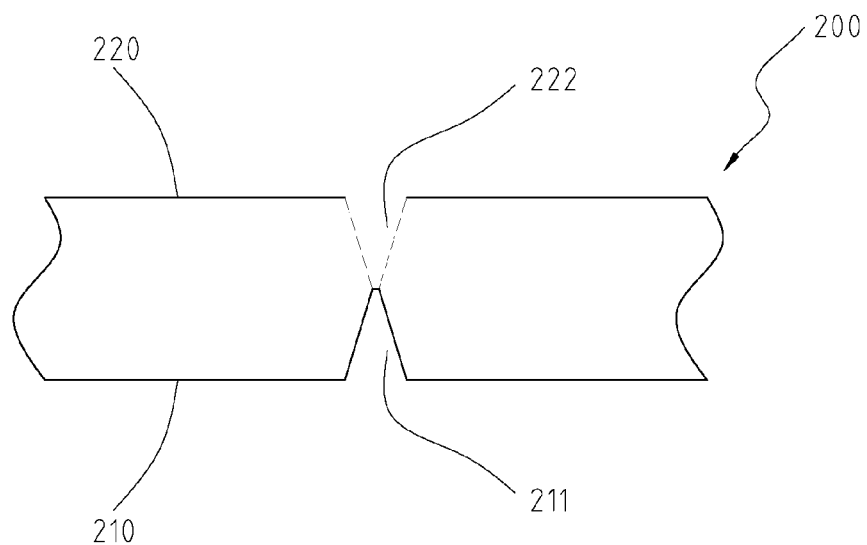
FIG. 3B is a schematic view (II) of deep hole processing according to an embodiment of the instant disclosure.

The control device 170 can drive, according to the image captured by the vision module 160, the motion platform 130 to displace the bearing table 132, so as to enable the focus spot of the first laser beam to be located at the predetermined processing position. Therefore, after the horizontal position and a vertical position of the workpiece are determined, the control device 170 can drive the focused laser source 110 to output the first laser beam, so as to enable the first laser beam to form a first recessed hole 211 at a predetermined position on a first surface 210 of the workpiece 200 (as shown in FIG. 3A). FIG. 3A is a schematic view (I) of deep hole processing according to an embodiment of the instant disclosure. Subsequently, the control device 170 can drive the rotating platform 140 to rotate the workpiece 200, so as to enable the workpiece 200 to be overturned by 180°. After the workpiece 200 is overturned, the control device 170 may drive the focused laser source 110 again to output the first laser beam, so as to enable the first laser beam to form a second recessed hole 222 on a second surface 220 of the workpiece 200, in which the second recessed hole 222 is opposite to the first recessed hole 211, the second surface 220 is opposite to the first surface 210, and the first recessed hole 211 is in communication with the second recessed hole 222 so as to form a deep hole 230 (as shown in FIG. 3B). FIG. 3B is a schematic view (II) of deep hole processing according to an embodiment of the instant disclosure. Here, due to the shape of the first laser beam, inner diameters of the first recessed hole 211 and the second recessed hole 222 decrease with increasing of depths. In an embodiment, a diameter of a deep hole 230 is less than 50 µm, and a depth of the deep hole 230 is less than 500 µm.

Here, after the workpiece 200 is overturned, the control device 170 can determine a position of the workpiece 200 by using the distance detected by the height sensor 150 and the image captured by the vision module 160, so as to ensure that the first recessed hole 211 and the second recessed hole 222 can be precisely connected with each other.

Figure 4A:
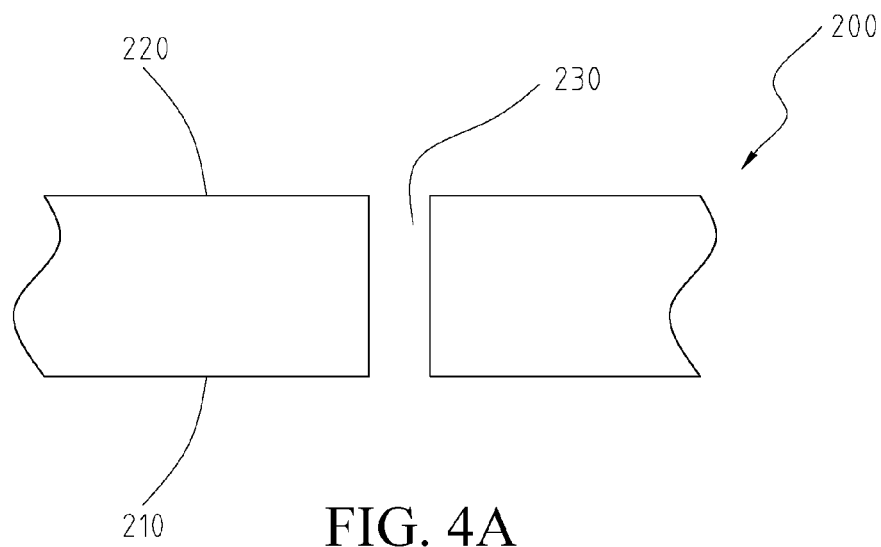
FIG. 4A is a schematic view (III) of deep hole processing according to an embodiment of the instant disclosure.

Referring to FIG. 1 and FIG. 2 again, in an embodiment, the double-directional machining laser machine tool 100 further includes a modification laser source 180 that is electrically connected to the control device 170 and controlled by the control device 170 to output a second laser beam. Here, a focus spot of the second laser beam is less than a focus spot of the first laser beam, so as to trim an inner wall of the deep hole 230. Referring to FIG. 4A, which is a schematic view (III) of deep hole processing according to an embodiment of the instant disclosure. The second laser beam can remove an uneven part of the inner wall of the deep hole 230 shown in FIG. 3B, so as to enable a diameter of the deep hole 230 to be identical, as shown in FIG. 4A. During a trimming process, the control device 170 drives the bearing table 132 of the motion platform 130 to move, so as to enable the workpiece 200 to move in a trimming range relative to the modification laser source 180. A wavelength and energy of the second laser beam can be determined according to a material of a workpiece, and a spot that is intended to form on the workpiece, which is not limited in the instant disclosure.

In some embodiments, a focus spot of a second laser beam may form a line focus because of having multiple focus points, and a laser cutting approach is used to trim and process an inner wall of a deep hole.

Figure 4B:
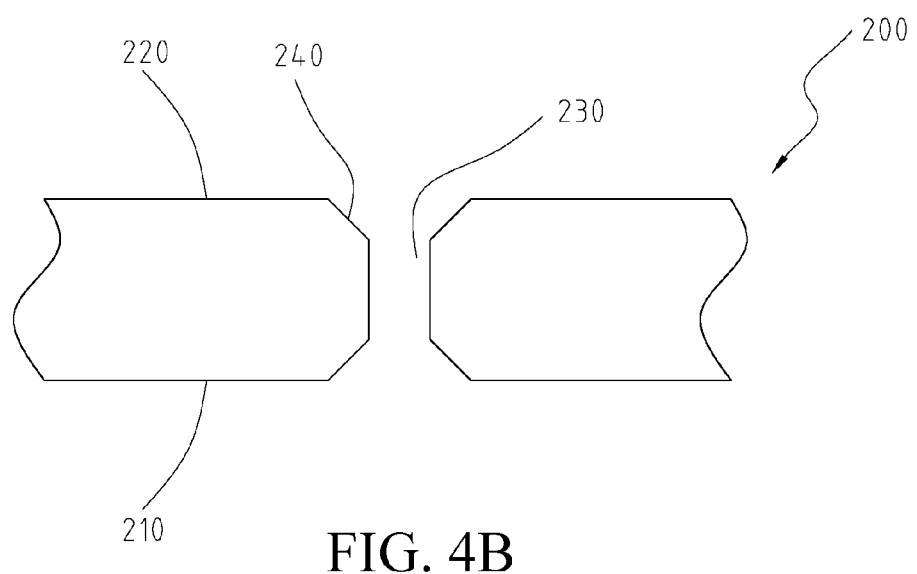
FIG. 4B is a schematic view (IV) of deep hole processing according to an embodiment of the instant disclosure.

Referring to FIG. 1 and FIG. 2, in one embodiment, the double-directional machining laser machine tool 100 further includes a diamond milling cutter 190 that is electrically connected to the control device 170, and is driven by the control device 170 to trim edges of openings at two ends of the deep hole 230, thereby forming chamfers 240 (as shown in FIG. 4B). FIG. 4B is a schematic view (IV) of deep hole processing according to an embodiment of the instant disclosure. During a trimming process, the control device 170 drives the bearing table 132 of the motion platform 130 to move, so as to enable the workpiece 200 to move in a trimming range relative to the diamond milling cutter 190.

In some embodiments, the diamond milling cutter 190 may be a face milling cutter that performs plane processing or small feed processing, or may be a striker-type milling cutter that performs two-dimensional curvature processing.

The foregoing embodiments are implemented by hanging the motion platform 130 upside down, but the instant disclosure is not intended to limit a position relationship thereby. In some embodiments, the motion platform 130 may be disposed on the base table 310, and is hung upside down on the frame body 320 by the lifting platform 120. The motion platform 130 also bears the rotating platform 140, and the lifting platform 120 also bears the focused laser source 110, the modification laser source 180, and the diamond milling cutter 190.

To sum up, the double-directional machining laser machine tool 100 provided in the embodiments of the instant disclosure can use the rotating disc 142 to rotate the workpiece 200, so that the focused laser source 110 separately performs drilling on two surfaces of the workpiece 200, thereby forming a relatively symmetrical deep hole 230. Moreover, the inner wall of the deep hole 230 can be trimmed by using the modification laser source 180. On the other hand, the lifting platform 120 may be provided with the focused laser source 110, the modification laser source 180, and the diamond drilling cutter 190 so as to perform high-precision processing at the same environment.

What is claimed is:

1. A double-directional machining laser machine tool, comprising:
   a focused laser source, outputting a first laser beam;
   a lifting platform, bearing the focused laser source;
   a motion platform, comprising a biaxial slide and a bearing table disposed on the biaxial slide;
   a rotating platform, connected to the bearing table, wherein the rotating platform is removably connected to a workpiece;
   a height sensor, detecting a distance between the height sensor and the workpiece;
   a vision module, capturing an image of the workpiece; and
   a control device, electrically connected to the focused laser source, the lifting platform, the motion platform, the rotating platform, the height sensor, and the vision module, wherein the control device drives, according to the distance detected by the height sensor, the lifting platform to lift the focused laser source up or down, and drives, according to the image, the motion platform to displace the bearing table, so as to enable the first laser beam to form a first recessed hole at a predetermined position on a first surface of the workpiece; the control device drives the rotating platform to rotate the workpiece, so as to enable the first laser beam to form a second recessed hole, opposite to the first recessed hole, on a second surface opposite to the first surface of the workpiece; and the first recessed hole is in communication with the second recessed hole so as to form a deep hole.

2. The double-directional machining laser machine tool according to claim 1, further comprising: a modified laser source outputting a second laser beam to trim an inner wall of the deep hole, wherein a focus spot of the second laser beam is less than a focus spot of the first laser beam.

3. The double-directional machining laser machine tool according to claim 2, further comprising a diamond milling cutter electrically connected to the control device so as to trim edges of openings at two ends of the deep hole.

4. The double-directional machining laser machine tool according to claim 1, further comprising a diamond milling cutter electrically connected to the control device so as to trim edges of openings at two ends of the deep hole.

5. The double-directional machining laser machine tool according to claim 1, wherein the bearing table performs displacement on a motion plane along the biaxial slide, and a rotating shaft of the rotating platform is parallel to the motion plane.

6. The double-directional machining laser machine tool according to claim 5, wherein a diameter of the deep hole is less than 50 µm, and a depth of the deep hole is less than 500 µm.

7. The double-directional machining laser machine tool according to claim 1, wherein a diameter of the deep hole is less than 50 µm, and a depth of the deep hole is less than 500 µm.

* * * * *